United States Patent
Cocchi et al.

(10) Patent No.: US 10,820,609 B2
(45) Date of Patent: Nov. 3, 2020

(54) MACHINE FOR MAKING LIQUID AND SEMI-LIQUID PRODUCTS

(71) Applicant: ALI GROUP S.r.l.—CARPIGIANI, Cernusco sul Naviglio (Milan) (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

(*) Notice: Subject to any disclaimer, the term of this patent is extended or adjusted under 35 U.S.C. 154(b) by 243 days.

(21) Appl. No.: 16/039,024

(22) Filed: Jul. 18, 2018

(65) Prior Publication Data
US 2019/0069573 A1    Mar. 7, 2019

(30) Foreign Application Priority Data
Sep. 7, 2017  (IT) .................. 102017000100181

(51) Int. Cl.
| | | |
|---|---|---|
| A23G 9/10 | (2006.01) | |
| B01F 9/12 | (2006.01) | |
| A23G 3/02 | (2006.01) | |
| A23G 9/22 | (2006.01) | |

(52) U.S. Cl.
CPC .......... *A23G 9/106* (2013.01); *A23G 3/0215* (2013.01); *A23G 9/103* (2013.01); *A23G 9/22* (2013.01); *B01F 9/12* (2013.01)

(58) Field of Classification Search
CPC ................................ A23G 9/103; A23G 9/106
USPC ..................... 366/144; 62/342, 381
See application file for complete search history.

(56) References Cited

U.S. PATENT DOCUMENTS

| | | | | |
|---|---|---|---|---|
| 2,282,862 A | * | 5/1942 | Genova ................ | A23G 9/16 62/188 |
| 3,952,538 A | | 4/1976 | Warlick | |
| 4,583,863 A | | 4/1986 | Pandolfi | |
| 5,363,746 A | * | 11/1994 | Gordon ................ | A23G 9/12 366/145 |

FOREIGN PATENT DOCUMENTS

FR    1417038 A    11/1965

OTHER PUBLICATIONS

Italian Search Report dated May 3, 2018 for counterpart Italian Patent Application No. IT 201700100181.

* cited by examiner

*Primary Examiner* — David L Sorkin
(74) *Attorney, Agent, or Firm* — Shuttleworth & Ingersoll, PLC; Timothy Klima (57) ABSTRACT

A machine for making liquid or semi-liquid products includes a thermal system using a main heat exchanger fluid, a compressor, a first heat exchanger and a pressure reducing element, all affected by circulation of the main heat exchanger fluid. A motor includes a drive shaft rotatable about a vertical axis. A production unit includes a first container with a processing chamber for making ice cream and a stirrer insertable into the first processing container. A second container includes a cavity rotatably housing the first container and which is fixed relative to a frame. Channels for circulating the main heat exchanger fluid are associated with the second container and define for the thermal system a second heat exchanger in which the main heat exchanger fluid circulates. A coupling mechanism couples the first container and drive shaft for transmission of motion from the motor to the first container.

11 Claims, 6 Drawing Sheets

MACHINE FOR MAKING LIQUID AND SEMI-LIQUID PRODUCTS

This application claims priority to Italian Application IT102017000100181 filed Sep. 7, 2017, the entirety of which is incorporated by reference herein.

BACKGROUND OF THE INVENTION

This invention relates to a machine and a method for making liquid and semi-liquid products of the sector of ice cream (gelato, sorbets, soft ice cream, etc.), bakery and confectionery (custard and chocolate creams, etc.) or catering (savory soups, etc.).

As is known, a need which is strongly felt in this sector is that of being able to make ice cream type products in small portions very quickly and to a customer's individual request.

In particular, one need which is felt particularly strongly in the trade is that of making liquid or semi-liquid food products instantly, while the customer waits.

A need which is felt particularly strongly by machine manufacturers, on the other hand, is that of being able to provide a machine which is capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

The aim of this invention is to provide a machine for making liquid or semi-liquid food products, which allows satisfying the above mentioned need and, more specifically, a machine which allows making small quantities of products of the ice cream, bakery and confectionery or catering sector particularly easily based on the requirements expressed on the spot by the customer.

Yet another aim of the invention is to provide a machine for making liquid and semi-liquid products of the ice cream, bakery and confectionery or catering sector and which is particularly safe in terms of food hygiene.

A yet further aim of the invention is to provide a machine for making liquid and semi-liquid products of the ice cream, bakery and confectionery or catering sector and which constitutes an alternative to the prior art solutions.

According to the invention, this aim is achieved by a machine for making liquid or semi-liquid products of the ice cream, bakery and confectionery or catering sector and comprising the technical features set out in one or more of the appended claims.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

With reference to the accompanying drawings, the numeral 1 denotes a machine for making liquid or semi-liquid products of the ice cream, bakery and confectionery or catering sector.

It should be noted that the machine 1 is, preferably, designed to make ice cream or bakery and confectionery or catering products.

By products of the ice cream or bakery and confectionery or catering sector are meant products such as ice cream, (soft ice cream, artisan gelato, sorbets, slushes, etc.) and products such as custard and chocolate creams or savory soups.

These products are food products which may be served hot or cold.

Preferably, but not exclusively, the machine 1 is an ice cream machine, designed to make ice cream (preferably artisan gelato).

In the context of the invention, the term "ice cream" is used to mean a food preparation which is based on milk or milk-derived products and to which fruit, aromatics or other ingredients are added to obtain different flavors.

Figure 7:
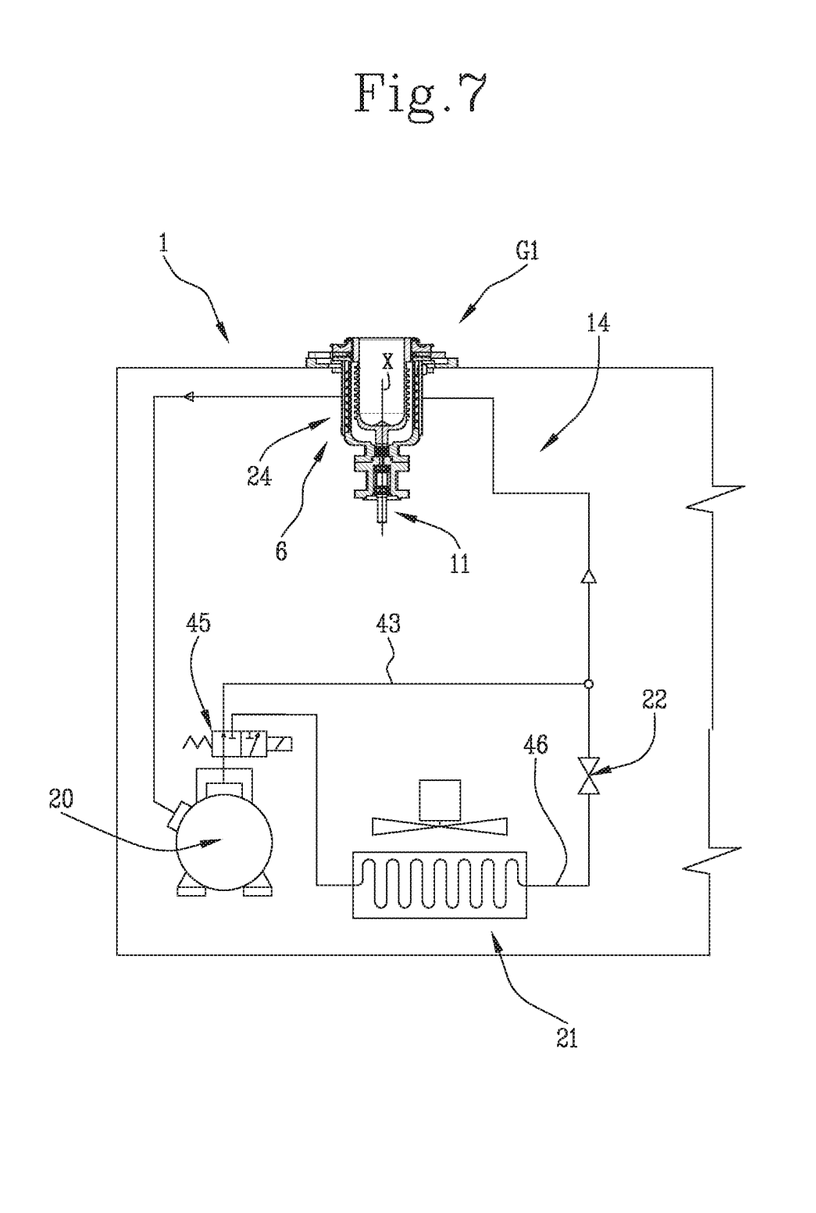
FIG. 7 is a schematic perspective view of a possible embodiment of the thermal system of the machine of FIG. 1.

The machine 1 comprises:

a frame 13;

a thermal system 14 for performing at least one thermodynamic cycle using a main heat exchanger fluid and including a compressor 20, a first heat exchanger 21 and a pressure reducing element 22, all having the main heat exchanger fluid flowing through them (as illustrated in FIG. 7);

a motor 12 equipped with a drive shaft 11 rotatable about a vertical axis X;

at least one production unit G1 comprising:

a first processing container 3 affording a cavity 9 which defines a processing chamber 4 for making a food product;

a stirrer 5 insertable into the first processing container 3;

a second container 6 which affords a cavity 7 shaped to rotatably house the first container 3 and which is fixed relative to the frame 13;

channels 8 for circulating the main heat exchanger fluid, associated with the second container 6 and defining for the thermal system 14 a second exchanger 24 in which the main heat exchanger fluid circulates;

coupling means 23 between the first processing container 3 and the drive shaft 11 to allow coupling and hence transmission of motion from the motor 12 to the first processing container 3 (through the drive shaft 11).

According to another aspect, the first processing container 3 and the second container 6 are cylindrical.

Preferably, the first processing container 3 and the second container 6 are, in use, disposed coaxially.

According to yet another aspect, the cavity 9 defining a processing chamber 4 is substantially cylindrical and the cavity 7 shaped to rotatably house the first container 3 is cylindrical.

It should be noted, in particular, that the cavity 9 is open only at the top.

The cavity 7, on the other hand, is open at the top to allow the processing container 3 to be inserted into it, and at the bottom to allow the first processing container 3 to be coupled to the drive shaft 11, as described in more detail below.

According to yet another aspect, the first processing container 3 can be housed removably within the cavity 7 inside the second container 6.

It should be noted that, in use, the first processing container 3 and the second container 6 define between them a gap 47—that is, an empty space 47—which contains (can be filled with, or in use, is filled with) a secondary heat exchanger fluid.

More precisely, it should be noted that the cavity 7 defines, between the second container 6 and the first container 3, a gap 47 which can be filled with a secondary heat exchanger fluid.

It should be noted that, preferably, the first container 3 is externally provided with at least one channel 30.

The function of the channel 30 is to allow optimum transmission of heat by means of a secondary heat exchanger fluid, which is interposed between the first container 3 and the second container 6.

In effect, when the first container 3 is driven in rotation, the presence of the channel 30 causes the secondary heat exchanger fluid to swirl, thus increasing the efficiency of heat exchange (making it possible to change from a state of natural convection to a state of forced convection).

Preferably, the secondary heat exchanger fluid (which in use is located in the gap 47 defined between the first container 3 and the inside wall of the second container 6) is glycol or a glycol mixture. It should be noted that the secondary fluid can be cooled or heated by heat exchange with the main heat exchanger fluid (through the walls of the second container 6).

According to another aspect, the channel 30 runs along a lateral (outer) surface of the first container 3.

According to another aspect, the channel 30 runs along a helical lateral surface of the first container 3.

It should also be noted that the machine 1 comprises a covering shell 41 which covers the channels 8 for circulating the main heat exchanger fluid and which is fixed externally of the second container 6 to sealedly cover the circulation channels 8.

It should be noted that the covering shell has an inlet 41A and an outlet 41B to allow the main heat exchanger fluid in and out of the channel 8, respectively.

The main heat exchanger fluid circulates inside the circulation channels 8: in effect, the second heat exchanger 24 forms part of the thermal system.

Thus, the main heat exchanger fluid is made to circulate in the circulation channels 8 by the pressure head generated by the compressor 20 of the thermal system.

It should be noted, therefore, that cooling and/or heating the product inside the first container 3 is accomplished by two heat exchanger fluids, namely a main heat exchanger fluid and a secondary heat exchanger fluid, which exchange heat with each other (through other elements).

According to another aspect, as illustrated in FIG. 7, the thermal system 14 comprises a bypass branch 43 designed to allow the main heat exchanger fluid to circulate between the compressor 20 and the second exchanger 24 to produce a thermodynamic, hot gas cycle.

According to this cycle, the main heat exchanger fluid is heated in the compressor and yields heat in the second exchanger 24, thus heating the secondary heat exchanger fluid.

It should be noted that the thermal system 14 also comprises switching means 45 configured to connect an outlet of the compressor 20 respectively and alternately:

A) to the bypass branch 43 (and thus to the inlet of the second exchanger 24);

B) to the branch 46 with the pressure reducing element 22 and the first exchanger 21.

It should be noted that the configuration A allows performing a hot gas thermodynamic cycle which heats the secondary heat exchanger fluid.

In the configuration B, on the other hand, a cooling thermodynamic cycle is performed (for example, a vapor compression cycle) which allows cooling the product inside the first container 3.

It should be noted that the thermal system 14 may or may not include the bypass branch and the switching means 45.

The switching means 45 preferably comprise one or more valves.

According to another aspect, the machine 1 comprises a cleaning device 32 having a pipe 33 and an operating head 34 associated with one end of the pipe 33 and provided with a cleaning fluid ejector nozzle 35 in fluid communication with the pipe 33.

Preferably, the cleaning fluid is water or a water mixture. The cleaning device 32 may be connected to the water mains or to a tank forming part of the machine and containing the cleaning fluid.

Preferably, the operating head 34 comprises a handgrip (for a user).

The operating head 34 also comprises a suction nozzle 36, connected to a device for generating a suction force and in fluid communication with the pipe 33.

It should be noted, therefore, that the suction nozzle 36 allows extracting the cleaning liquid and/or product residues from the first container 3 in order to clean the inside of the first container 3.

Preferably, the suction nozzle 36 is connected to a drain or to a container used to collect the extracted product for disposal at a later stage.

Figure 1:
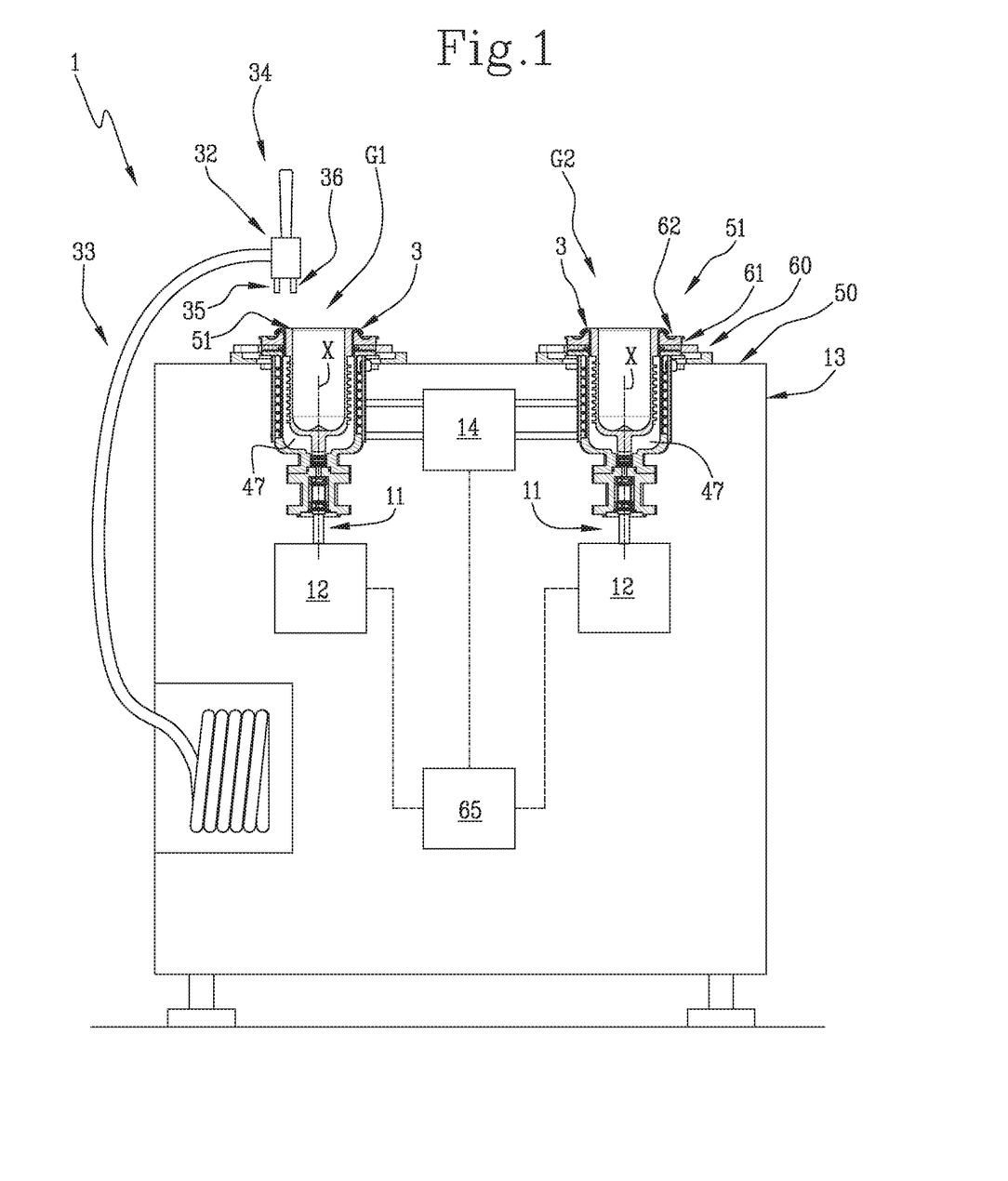
FIG. 1 is a schematic view of a machine according to this invention.
Figures 2, 3:
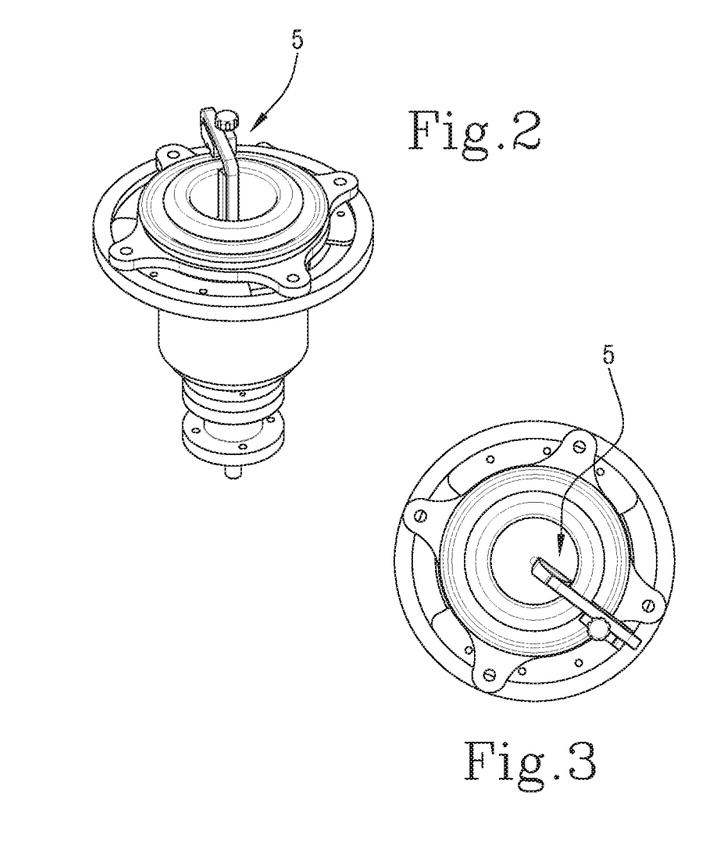
FIGS. 2 and 3 illustrate respective perspective views of a detail of the machine of FIG. 1.
Figure 4:
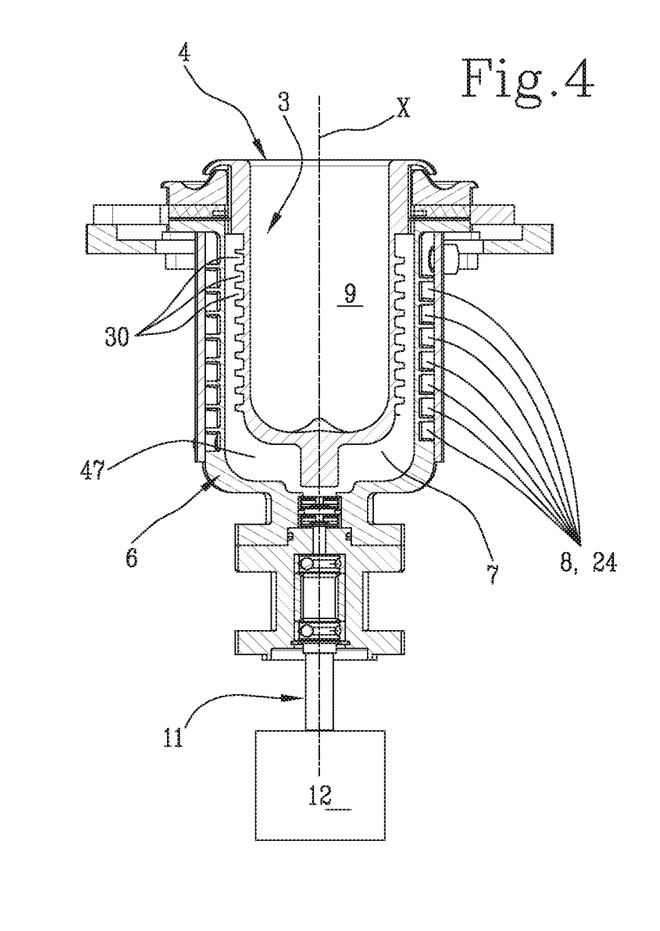
FIG. 4 is a cross-sectional view of the detail of FIGS. 2 and 3.
Figure 5:
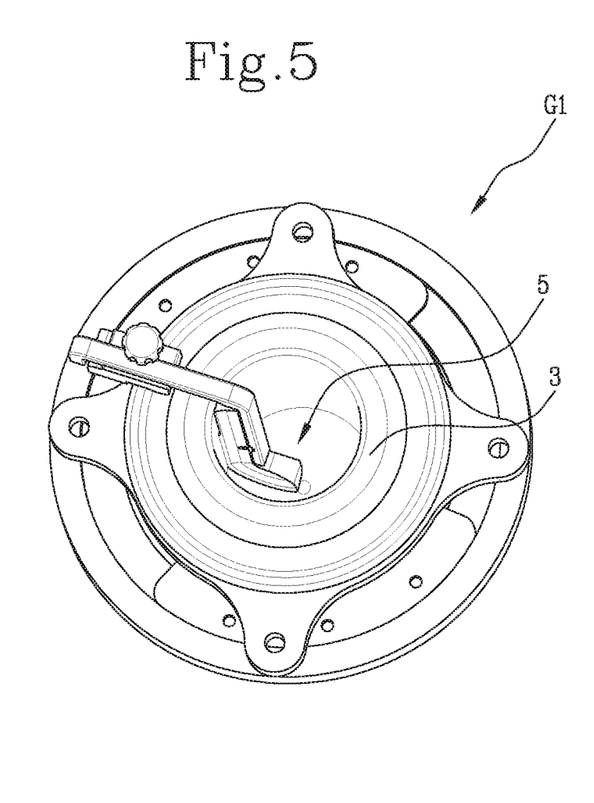
FIG. 5 is another perspective view of the detail of FIGS. 2 and 3.

As illustrated in FIG. 1, the machine 1 preferably comprises a plurality of production units (G1, G2), each comprising:

a first processing container 3 affording a cavity 9 which defines a processing chamber 4 for making an ice cream product;

coupling means 23 for coupling to the drive shaft 11;

a stirrer 5 insertable into the first processing container 3;

a second container 6 affording a cavity 7 shaped to rotatably house the first container 3, the second container 6 being covered by a channel 8 for circulating the heat exchanger fluid and defining for the thermal system 14 a second exchanger 24, and the second container 6 being fixed to (connected as one with) the frame 13;

coupling means 23 between the first processing container 3 and the drive shaft 11 to allow coupling and hence transmission of motion from the motor 12 to the first processing container 3.

It should be noted that according to this aspect, the machine 1 may comprise a single thermal system 14 capable of serving a plurality of second exchangers 24 of respective production units or a plurality of thermal systems 14 (each serving a production unit).

The machine 1 preferably comprises a worktop 50 provided with at least one cavity 51 into which a first container 3 is inserted.

The second container 6 is also placed inside the cavity 51.

With reference to the coupling means 23, attention is drawn to the following.

Figure 6:
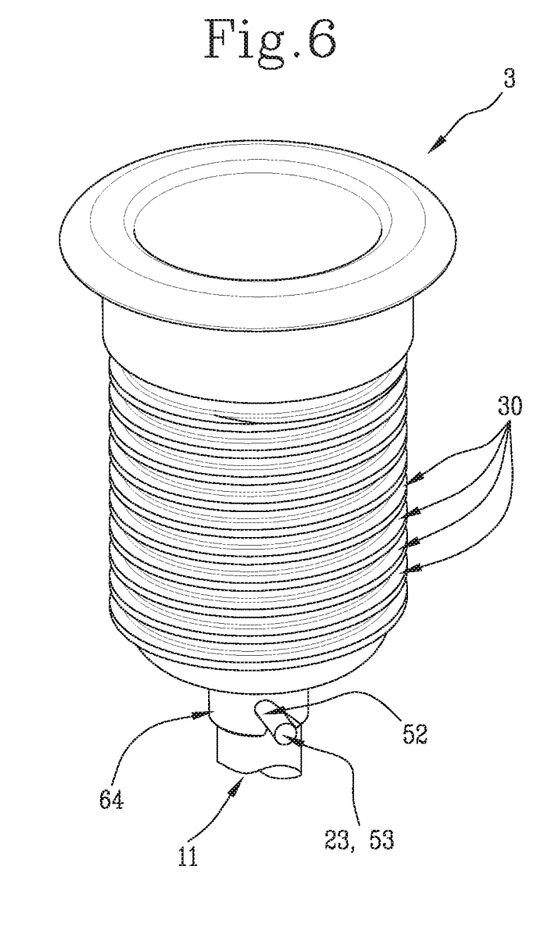
FIG. 6 is a schematic perspective view of a detail of what is illustrated in the preceding figures.

As clearly shown in FIG. 6, the first container 3 comprises a protuberant portion 64. The protuberant portion 64 comprises coupling grooves 52 forming part of the coupling means 23.

In addition, the drive shaft 11 of the motor 12 has a pair of protrusions 53 (forming part of the coupling means 23) adapted to be coupled with the coupling grooves 52 to allow locking the first container 3 to the drive shaft 11 and preventing it from rotating (see FIG. 6).

Thus, more generally speaking, the coupling means 23 comprise at least one protrusion 53 on the drive shaft 11 of the motor 12 and at least one coupling groove 52 on the first container 3 (preferably on the protuberant portion 64).

It should be noted that in embodiments not illustrated, the coupling means 23 may be embodied in different ways.

In a further embodiment, the coupling means 23 comprise at least one ferromagnetic element in either the drive shaft 11 or the first container 3 and at least one magnetic element in the other between the drive shaft 11 and the first container 3.

In yet another embodiment, the coupling means 23 comprise a first profile on the first container 3 and a second profile on the end of the drive shaft 11, with the first and second profiles being shaped to be coupled to each other.

Preferably, each production unit (G1, G2) is independent of the others.

That way, it is possible to operate one or more production units (G1, G2) as required.

It should be noted that the stirrer 5 is fixed to the frame. In other words, while the first container 3 is driven in rotation, the stirrer 5 is fixed, that is to say, static.

It should be noted that the machine 1 preferably also comprises a control and drive unit 65.

Figure 8:
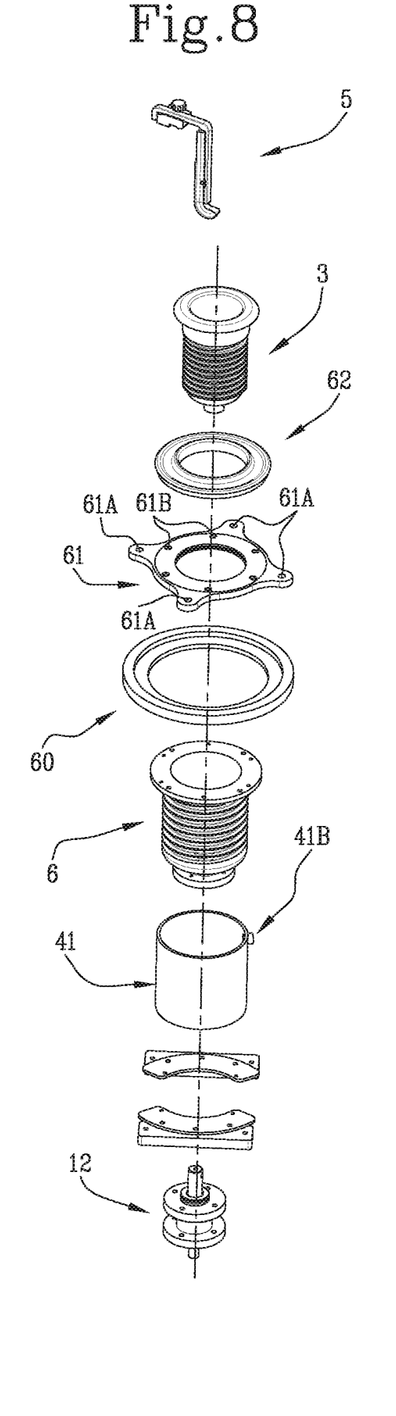
FIGS. 8 and 9 show respective details of the production unit of the machine of FIG. 1.
Figure 9:
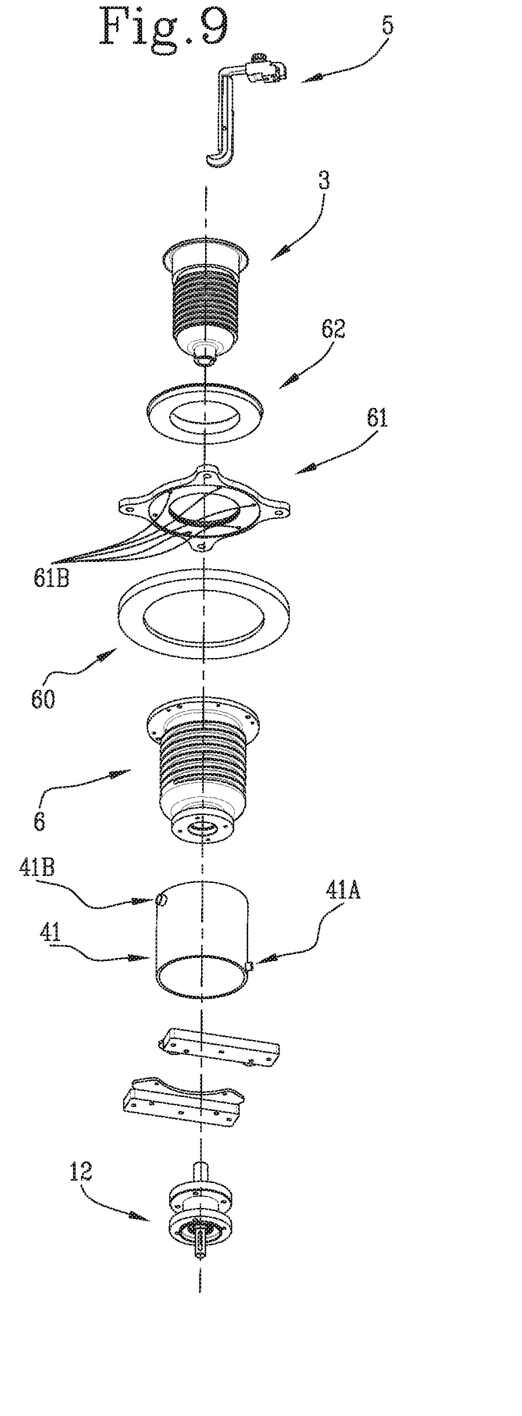
Figure 10:
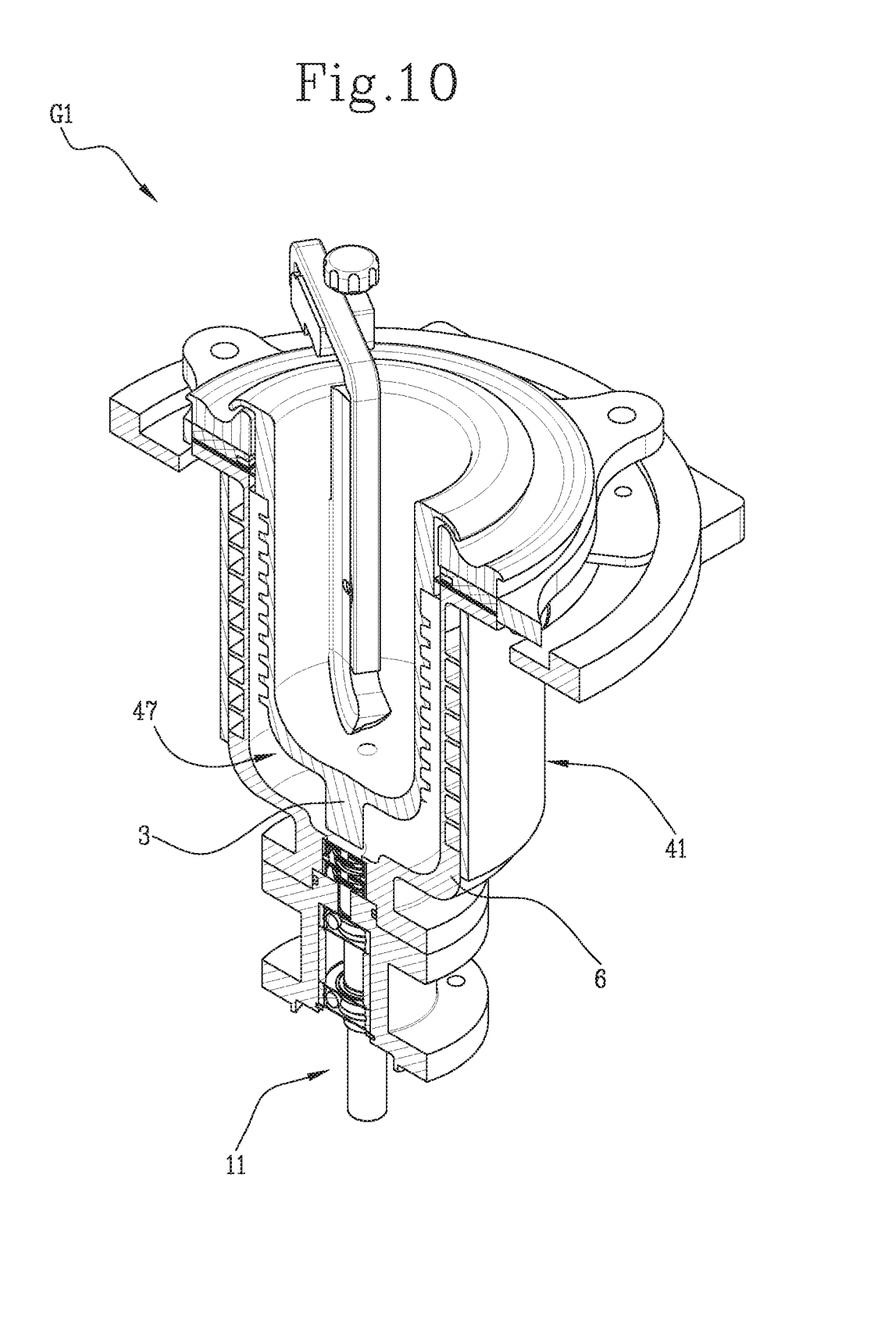
FIG. 10 is a perspective view of a detail of the production unit of the preceding figures.

FIGS. 8 and 9 illustrate further components which allow coupling the second container 6 and the first container 3 to the frame 13.

More specifically, the machine 1 comprises a first gasket 60 which is adapted to be coupled to the second container 6.

It should be noted that the first gasket 60 is, in use, disposed to rest on the worktop 50.

The machine 1 also comprises a fastening ring 61 which locks the second container 6 to the frame 13.

More specifically, the fastening ring 61 is fixed to the worktop 50 and also allows locking the second container 6 against the worktop 50.

The fastening ring 61 comprises first (through) holes 61A for fastening the ring to the worktop 50 and second (through) holes 61B for fastening the second container 6.

The holes 61A and 61B are preferably associated with screws.

The machine 1 is also particularly safe in terms of food hygiene: in effect, dripping is substantially avoided because cleaning is carried out directly in place (using the cleaning device).

The machine 1 also comprises a second gasket 62 which, in use, is placed under the second container 6 and above the fastening ring 61.

It should be noted that problems with ice are advantageously avoided, for example during cleaning, by adopting a thermal system 14 as laid out in FIG. 7: in effect, during cleaning, the walls of the first container 3 can be heated (using the hot gas cycle), thereby preventing the cleaning fluid from freezing and at the same time allowing the first container 3 to be removed.

Also, by adopting the thermal system 14 of FIG. 7 in the machine 1 of the invention, it is possible to extract the first container 3 particularly easily at the end of the production cycle: in effect, heating the secondary fluid makes it very easy to handle and detach the first container 3.

It should also be noted that the particularly reduced amount of secondary heat exchanger fluid means that thermal inertia during operation of the thermal system 14 is low both in cooling and in heating the heat exchanger fluid: thus, a steady state in transmitting heat from the main fluid to the secondary fluid can be reached particularly rapidly.

What is claimed is:

1. A machine for making liquid or semi-liquid food products, comprising:
   a frame;
   a thermal system for performing at least one thermodynamic cycle using a main heat exchanger fluid and including a compressor, a first heat exchanger and a pressure reducing element, all affected by circulation of the main heat exchanger fluid;
   a motor equipped with a drive shaft rotatable about a vertical axis;
   at least one production unit comprising:
      a first processing container including a first cavity which defines a processing chamber for making a liquid or semi-liquid food product;
      a stirrer insertable into the first processing container;
      a second container including a second cavity shaped to rotatably house the first processing container and which is fixed relative to the frame to define between the second container and the first processing container a gap for a secondary heat exchanger fluid;
      at least one channel for circulating the main heat exchanger fluid, thermally connected with the second container and defining for the thermal system a second exchanger in which the main heat exchanger fluid circulates;
      a rotary coupler between the first processing container and the drive shaft to provide coupling and hence transmission of motion from the motor to the first processing containers;
      the first processing container including an external channel.

2. The machine according to claim 1, wherein the first processing container and the second container are cylindrical.

3. The machine according to claim 1, wherein the first cavity defining the processing chamber is substantially cylindrical and the second cavity shaped to rotatably house the first processing container is cylindrical.

4. The machine according to claim 3, wherein the first processing container is housed removably within the second cavity inside the second container.

5. The machine according to claim 1, wherein the external channel runs along a lateral surface of the first processing container.

6. The machine according to claim 5, wherein the external channel runs along a helical lateral surface of the first processing container.

7. The machine according to claim 1, comprising a covering shell which covers the at least one channel for circulating the main heat exchanger fluid and which is fixed externally to sealingly cover the at least one circulation channel.

8. The machine according to claim 1, wherein the thermal system comprises a bypass branch allowing the main heat exchanger fluid to circulate between the compressor and the second exchanger to produce a thermodynamic, hot gas cycle.

9. The machine according to claim 1, and further comprising a cleaning device having a pipe and an operating head associated with one end of the pipe and including a cleaning fluid ejector nozzle in fluid communication with the pipe.

10. The machine according to claim 9, wherein the operating head also comprises a suction nozzle, connected to a device for generating a suction force and in fluid communication with the pipe.

11. The machine according to claim 1, wherein the at least one production unit comprises a plurality of the production units.

* * * * *